April 28, 1942.   A. L. HOOVER   2,281,292
COUPLING MEANS
Filed May 24, 1940
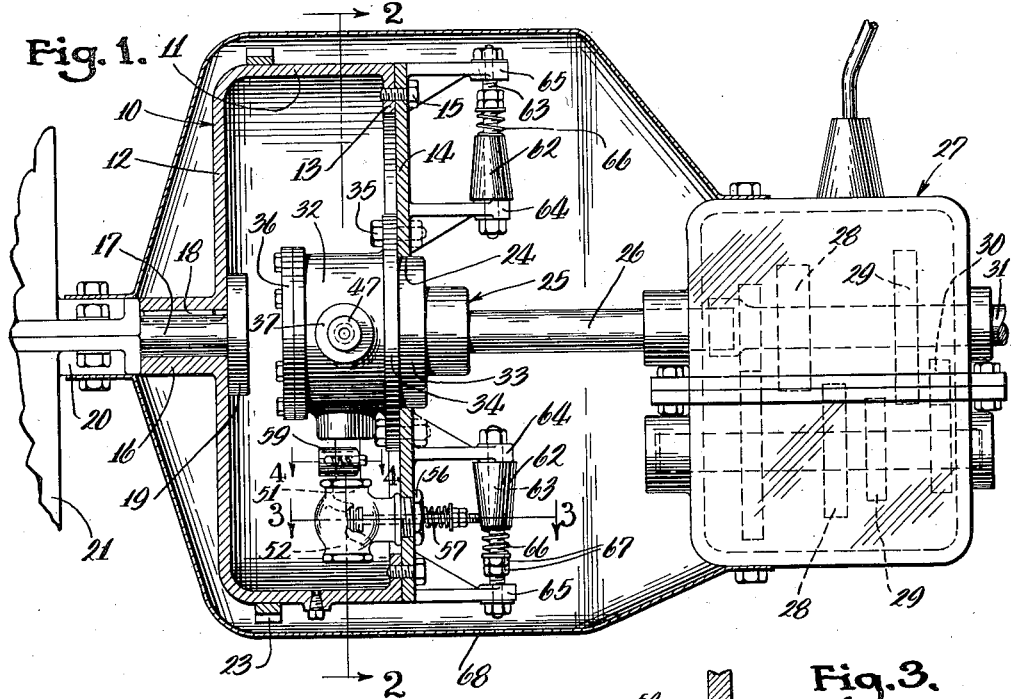
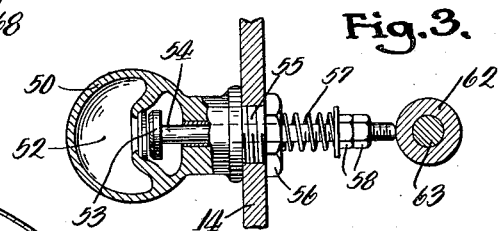
Fig.3.
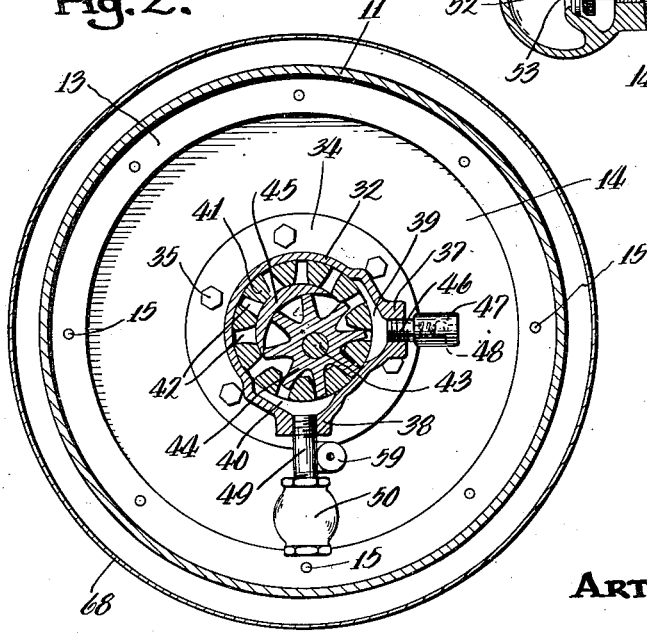
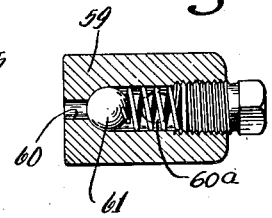
Fig.4.
ARTHUR L. HOOVER
INVENTOR
ATTORNEYS Patented Apr. 28, 1942

2,281,292

UNITED STATES PATENT OFFICE 2,281,292

COUPLING MEANS

Arthur L. Hoover, Avery, Milan Township,
Erie County, Ohio

Application May 24, 1940, Serial No. 336,992

6 Claims. (Cl. 192—61)

This invention relates to coupling means, more particularly to coupling means in the nature of a fluid clutch for an automobile, and the principal object of this invention is to provide new and improved means of the character described.

In the drawing accompanying this specification, and forming a part of this application, there is shown, for purposes of illustration, one form which the invention may assume, and in this drawing:

Figure 1 is a sectional view showing an embodiment of the invention, certain parts being shown in elevation, and certain other parts, to which the embodiment is connected, being fragmentarily shown, Figure 2 is a transverse section corresponding generally to the line 2—2 of Figure 1, Figure 3 is an enlarged sectional view corresponding generally to the line 3—3 of Figure 1, and Figure 4 is an enlarged sectional view of a detail, the section corresponding generally to the line 4—4 of Figure 1.

Referring particularly to Figures 1 through 4, the embodiment of the invention therein disclosed comprises a fluid casing 10, here shown to be cylindrical in form, and including a cylindrical wall 11 closed at one end by an end wall 12, and at its other end having an inturned flange 13 to which a removable closure wall 14 may be secured, as by means of the bolts 15, which in this embodiment pass through apertures in the wall 14, and are received within screw-threaded apertures formed in the flange 13. The casing 10 is substantially filled with suitable fluid, preferably a type of oil possessing the property of maintaining an almost constant viscosity over a wide range of temperature. In some instances, the casing 10 is heavy enough so that a flywheel may be dispensed with, as is true in the construction illustrated in Figures 1 through 4; in other instances, it is desirable to provide the crank shaft with the usual flywheel.

The end wall 12 may be provided with a central hub 16 embracing a portion of a shaft, and in this embodiment such shaft is the rear end of the crank shaft 17. The hub 16 and shaft 17 are secured together for rotation, as by means of a key 18, and the crank shaft may have an enlarged head 19 holding the hub 16 and the shaft 17 against longitudinal movement in one direction, a bearing 20, in this embodiment, holding the hub 16 and shaft 17 against longitudinal movement in the other direction, the bearing 20 forming part of the engine 21. From the description so far, it will be clear that the fluid casing 10 is rotatable with the crank shaft 17 of the engine 21. The cylindrical wall 11 may have a ring gear 23 formed integral therewith, or as here shown attached to the outer surface thereof, the ring gear being for the purpose of cooperating with suitable engine starting mechanism (not shown).

The wall 14 is apertured as at 24, to pass a portion of a fluid pump means 25. The fluid pump means 25 comprises relatively movable portions, one portion being secured for rotation with the shaft 17, while the other portion is secured for rotation with a shaft 26, which in the particular embodiment shown comprises part of the driven shaft of the automobile mechanism. The shaft 26, as shown in Figure 1, extends to a transmission case 27, which preferably contains the usual "high" gears 28, "low" gears 29, and a "reverse" gear 30, a shaft 31 leaving the transmission case 27, and usually extending to the differential of the automobile. The usual shift lever is provided for shifting the gears into "high," "low," "reverse," or "neutral" positions.

The relatively movable portions of the fluid pump means 25 are so constructed and arranged that upon relative movement of the shafts 17 and 26, such portions are caused to move relatively, and such relative movement acts on the fluid in the casing 10, and under certain conditions this fluid influences the pump portions against relative movement, thus providing for transmission of movement from the shaft 17 to the shaft 26.

Any suitable fluid pump means may be used for the purpose described, and in the particular embodiment shown in the application, the pump is of the type commercially known as the Viking pump. Such pump, as adapted for use in this invention, comprises a pump casing 32 having a bearing part 33 extending through the aperture 24 in the wall 14. Inwardly of the bearing part 33 is a circular flange 34, of a larger diameter than the aperture 24, for the purpose of securing the pump casing 32 to the wall 14, as by means of the bolts 35. Suitable packing material (not shown) may be interposed between the flange 34 and the wall 14, to provide for a fluid-tight joint. The pump casing 32 is closed by a removable cover 36. As best shown in Figure 2, the pump casing 32 is provided with an inlet port 37, and an outlet port 38, and in this embodiment the ports are shown as spaced apart 90°, although the ports may be spaced apart any other amount, as for instance such ports may be spaced apart 180°.

The pump casing 32, in the form herein shown, is generally cylindrical, and is formed with an inlet recess 39 at the inlet port 37, and an outlet recess 40 at the outlet port 38. Rotatable within the pump casing 32 is a rotor 41, so attached to the shaft 26 that it is rotatable therewith. The rotor 41 is in the form of a ring gear, providing interior tooth spaces 42. The cover 36 carries an idler pin 43, on which is mounted an idler gear 44 adapted to mesh with the toothed spaces 42 of the rotor 41. The idler pin 43 is disposed off-center with respect to the rotor 41, and a crescent-shaped member 45, carried by the cover 36, fills the space formed by the off-center positioning of the idler gear 44 with respect to the rotor 41. The fluid pump means of the particular type herein shown is well suited for use in the coupling means construction, since it is positive in action, and delivers a continuous and steady stream of fluid, without splashing or pounding. Also, the liquid pumped is not caused to foam or churn, and the pump is not only a positive suction pump, but likewise is a positive discharge pump.

In the embodiment shown, the pump casing 32 revolves with the crank shaft 17, and assuming that the shaft 26 is stationary, or at least revolving at a lesser speed than the shaft 17, fluid from the casing 10 will be drawn through the inlet port 37, and will be discharged from the outlet port 38.

The inlet port 37 is formed with a screw-threaded opening for receiving a conduit 46, and carried by the conduit 46 is a check valve 47 comprising a spring-pressed ball valve 48 so constructed and arranged that fluid may be drawn by suction through the valve 47 and into the pump casing 32, but is automatically prevented from flowing in a reverse direction. The outlet port 38 is provided with a screw-threaded opening for receiving a conduit 49, the conduit 49 leading to a valve 50, here shown to be of the ordinary globe type, having its inlet chamber 51 communicating with the conduit 49, and its outlet chamber 52 communicating with the interior of the casing 10. Passage from the inlet chamber 51 to the outlet chamber 52 is controlled by a valve member 53, carried in the usual manner by a valve stem 54. The valve stem 54, as best shown in Figure 4, passes through an aperture in the wall 14 and extends outwardly from the casing 10. As shown, the valve 50 has a threaded neck 55 extending through the opening in the wall 14, and a nut 56 clamps the wall 14 between it and a shoulder formed on the body of the valve 50. Exteriorly of the casing 10, the valve stem 54 is surrounded by a coil spring 57, for yieldably holding the valve member 53 in position providing for free communication between the inlet and outlet chambers 51 and 52. Adjusting and lock nuts 58 may be threaded on the valve stem 54, for the purpose of adjusting the force of the spring 57, and thus providing a means for regulating the conditions under which the valve will be moved toward closed position.

A body 59 is connected to the conduit 49, and has a port 60 which communicates with the interior of the conduit 49 by means of a passage 60a, the port 60 being controlled by a spring-pressed ball check valve 61, so constructed and arranged that flow of fluid outwardly of the port 60 is prevented, while under certain suction conditions flow inwardly of the port is permitted.

Centrifugal means is provided for operating the valve 50, and in the embodiment shown comprises a weighted means carried for rotation with the crank shaft 17, and movable toward or away from the center of rotation, depending upon the speed of rotation. In the embodiment shown in Figures 1 through 4, only one valve is used; however, for the purpose of balancing the construction, the centrifugal means comprises similar diametrically opposite portions, and the similar parts of said portions will be referred to by the same reference numerals.

Referring particularly to Figure 1, the particular centrifugal means herein shown comprises a pair of weighted members 62, each having a frustro-conical form, the larger diameter being directed toward the center of rotation. Each member 62 is carried for sliding movement along a rod 63 extending between spaced arms 64 and 65, and each member 62 is yieldably held in its innermost radial position by means of a spring 66. The yielding force with which the respective member 62 is held in its innermost position is regulatable by means of adjusting and locking nuts 67 threaded on the rod 63. Referring to the position of parts in Figure 1, the lowermost weighted member 62 is adapted for cooperation with the valve stem 54 of the valve 50, and as shown, the outward extremity of the valve stem 54 is in position to slidably engage the peripheral surface of the weighted member 62. A stationary casing 68 may be secured to the engine and the transmission case 27, in position enclosing the coupling means, so as to protect the revolving parts against injury. It will be appreciated that the coupling means requires substantially perfect balance, and for this purpose, suitable means (not shown) may be provided.

Operation of the structure thus far described is as follows: With the engine 21 operating, and the gears in the transmission case either in engagement or in "neutral" relation, the crank shaft 17, fluid casing 10, the pump casing 32, the valve 50, and the centrifugal means including the weighted members 62, will rotate as a unit. The shaft 26 is stationary, thus causing relative rotation of the rotor 41 with respect to the pump casing 32, such relative rotation providing pumping action when the pump casing 32, in the arrangement of parts shown in Figure 2 of the drawing, rotates in a clockwise direction. This pumping action causes a suction at the inlet port 37 which unseats the ball check valve 48, and permits fluid from the casing 10 to be drawn into the inlet recess 39, and such fluid is pumped to the discharge recess 40 and through the conduit 49 into the inlet chamber 51 of the valve 50, past the normally open valve member 53, and outwardly of the outlet chamber 52 of the valve 50 and back to the fluid casing 10. As the speed of rotation of the crank shaft 17 is increased, the weighted members 62 will be moved radially outward by centrifugal force, the inclined surface of the proper member 62 cooperating with the valve 50, and camming the valve stem 54 inwardly of the casing of the valve 50 and moving the valve member 53 toward its closed position, thus restricting the discharge from the discharge port 38 of the pump casing 32, and creating a pressure which acts to restrict relative rotation of the rotor 41 with respect to the pump casing 32, causing the rotor 41 to drag and transmit movement to the shaft 26. It will be appreciated that when the valve member 53 is moved to its entirely closed position, a sufficient pressure will be built up at the discharge port 38 to substantially prevent all relative movement between the rotor 41 and the pump casing 32, so that the rotor 41 and pump casing 32 will substantially rotate together in the same direction, and therefore the shafts 17 and 26 are substantially directly connected for rotation.

It will be appreciated that with the gears in the transmission case 27 in one of their connected relations, the centrifugal operating means are to be so adjusted that the motor 21 may be started and idled without effecting coupling of the shafts 17 or 26. For all normal purposes the "high" gears 28 are always in engagement, and the control parts are so arranged that the automobile may be completely stopped with the motor running at substantially idling speed, and may be started in motion merely by acceleration of the engine speed. Therefore, the "low" gears 29 are preferably engaged only when unusual driving power is required, such as on a steep hill, or the like. Of course, the "reverse" gear 30 is engaged only when it is desired to back the automobile. The adjustment of the centrifugal operating means is preferably such that the shafts 17 and 26 are coupled to rotate at substantially the same speed when the "high" gears 28 are engaged and the automobile is moving at a predetermined rate of speed, such as for instance from five to ten miles an hour and upwards thereof. It will be appreciated that, if desired, the gears in the transmission case 27 may be moved to "neutral" position, so that the engine 21 may be operated at a relatively high speed, such as for the purpose of testing and adjusting the engine.

The coupling means hereinbefore described is so constructed and arranged that the relation of driving and driven shafts hereinbefore referred to may be reversed. This reversal is brought about when the shaft 26 is called upon to drive the engine 21, as for instance when the automobile is going down grade, or when the compression of the engine 21 is used as a means of braking the speed of the automobile. It will be seen that under such reversed conditions the shaft 26 is now the driving shaft, and the crank shaft 17 is being driven. Under these conditions the idler gear 44 will rotate in the opposite direction with respect to the pump casing 32. Therefore, in the event that the speed of rotation is high enough to move the weighted member 62 to close the valve member 53, a suction will be created at the port 60 of the body 59, causing unseating of the ball check valve 61, and permitting fluid to be drawn from the casing 10 through the conduit 49 and into the pump casing 32, and such fluid will be pumped to what is formerly the inlet port 37, and the pressure of the fluid at this inlet port will close the ball check valve 48, thus building up a pressure at the inlet port 37 which tends to oppose relative rotation of the rotor 41 with respect to the casing 32, and accordingly, as before, the shafts 17 and 26 will be coupled to rotate at substantially the same speed.

From the foregoing it will be apparent to those skilled in the art that I have accomplished at least the principal object of my invention, and it also will be apparent to those skilled in the art that the embodiment herein described may be variously changed and modified, without departing from the spirit of the invention, and that the invention is capable of uses and has advantages not herein specifically described; hence it will be appreciated that the herein disclosed embodiment is illustrative only, and that my invention is not limited thereto.

I claim:

1. Coupling means, for coupling a driving shaft and a driven shaft, comprising: means forming a fluid chamber; fluid in said chamber; fluid pump means, including casing means and rotor means, said casing means having inlet and outlet ports, and being connected for rotation with one of the shafts, and said rotor means being connected for rotation with the other of the shafts, so that relative rotation of said driving and driven shafts causes relative rotation between said casing means and said rotor means, such relative rotation drawing fluid from said fluid chamber through said inlet port and into said casing means, and discharging such fluid from said casing means through said outlet port and back to said fluid chamber; valve means constructed and arranged to control only the fluid discharge through said outlet port; and means, disposed exteriorly of said fluid chamber, constructed and arranged to move said valve means toward closed position restricting fluid discharge through said outlet port when the driving shaft is rotating at a predetermined speed, such restricting of fluid discharge providing opposition to the relative movement between said casing means and said rotor means and causing transmission of movement from the driving shaft to the driven shaft.

2. Coupling means, for coupling a driving shaft and a driven shaft, comprising: means forming a fluid chamber; fluid in said chamber; fluid pump means, including casing means and rotor means, said casing means having inlet and outlet ports, and being connected for rotation with one of the shafts, and said rotor means being connected for rotation with the other of the shafts, so that relative rotation of said driving and driven shafts causes relative rotation between said casing means and said rotor means, such relative rotation drawing fluid from said chamber through said inlet port and into said casing means, and discharging such fluid from said casing means through said outlet port and back to said chamber; valve means constructed and arranged to control only the fluid discharge through said outlet port; and centrifugal means, disposed exteriorly of said fluid chamber, controlled by the speed of said driving shaft, and constructed and arranged to provide for opening of said valve means when the speed of said driven shaft is below a predetermined R. P. M., and to provide for closing of said valve means when the speed of the driven shaft is above said predetermined R. P. M., closing action of said valve means restricting fluid discharge through said outlet port, thus providing opposition to the relative movement between said casing means and said rotor means and causing transmission of movement from the driving shaft to the driven shaft.

3. Coupling means, for coupling the crank shaft of an automobile engine to the drive shaft of the automobile, comprising: means, connected for rotation with the crank shaft, and forming a fluid chamber; fluid in said chamber; fluid pump means, including casing means and rotor means, said casing means having inlet and outlet ports and being connected for rotation with said chamber forming means, and said rotor means being connected for rotation with the drive shaft, so that relative rotation of the crank shaft and the drive shaft causes relative rotation between said casing means and said rotor means, such relative rotation drawing fluid from said chamber through said inlet port and into said casing means, and discharging such fluid from said casing means through said outlet port and back to said chamber; valve means, constructed and arranged to control the fluid discharge through said outlet port; means, controlled by the speed of rotation of the crank shaft, constructed and arranged to move said valve means to closed position restricting fluid discharge through said outlet port when the crank shaft is rotating at a predetermined speed, such restricting of fluid discharge providing opposition to the relative movement between said casing means and said rotor means and causing transmission of movement from the crank shaft to the drive shaft; and means, constructed and arranged to cause said fluid pump means to transmit movement from the drive shaft to the crank shaft when conditions are such that the drive shaft is caused to drive the crank shaft, comprising a check valve bypassing said valve means and providing an inlet to said casing through said exhaust port, and a check valve preventing flow outward of said inlet port.

4. Coupling means, for coupling a driving shaft and a driven shaft, comprising: means forming a fluid chamber; fluid in said chamber; fluid pump means, including casing means and rotor means, said casing means having inlet and outlet ports, and being connected for rotation with one of the shafts, and said rotor means being connected for rotation with the other of the shafts, so that certain relative rotation of said driving and driven shafts causes relative rotation between said casing means and said rotor means, such relative rotation drawing fluid from said fluid chamber through said inlet port and into said casing means, and discharging such fluid from said casing means through said outlet port and back to said fluid chamber; valve means constructed and arranged to control the fluid discharge through said outlet port; means, constructed and arranged to move said valve means toward closed position restricting fluid discharge through said outlet port, such restricting of fluid discharge providing opposition to the relative movement between said casing means and said rotor means and causing transmission of movement from the driving shaft to the driven shaft; and means, constructed and arranged to couple said shafts when certain other relative rotation exists between the driving and driven shafts, comprising means by-passing said valve means and providing an inlet to said casing means through said exhaust port, and means preventing fluid flow outwardly of said inlet port.

5. Coupling means, for coupling a driving shaft and a driven shaft, comprising: means forming a fluid chamber; fluid in said chamber; fluid pump means, including casing means and rotor means, said casing means having inlet and outlet ports, and being connected for rotation with one of the shafts, and said rotor means being connected for rotation with the other of the shafts, so that relative rotation of said driving and driven shafts causes relative rotation between said casing means and said rotor means, such relative rotation drawing fluid from said fluid chamber through said inlet port and into said casing means, and discharging such fluid from said casing means through said outlet port and back to said fluid chamber; valve means constructed and arranged to control the fluid discharge through said outlet port; and centrifugal means, disposed exteriorly of said fluid chamber, comprising weighted means mounted for movement radially of the axis of rotation, said weighted means being biased in a direction toward the axis of rotation, but being movable radially outwardly as the rotation of the driving shaft reaches a predetermined speed, and during such outward movement being constructed and arranged to move said valve means toward closed position restricting fluid discharge through said outlet port, such restricting of fluid discharge providing opposition to the relative movement between said casing means and said rotor means and causing transmission of movement from the driving shaft to the driven shaft.

6. Coupling means, for coupling a driving shaft and a driven shaft, comprising: means forming a fluid chamber; fluid in said chamber; fluid pump means, including casing means and rotor means, said casing means having inlet and outlet ports, and being connected for rotation with one of the shafts, and said rotor means being connected for rotation with the other of the shafts, so that relative rotation of said driving and driven shafts causes relative rotation between said casing means and said rotor means, such relative rotation drawing fluid from said fluid chamber through said inlet port and into said casing means, and discharging such fluid from said casing means through said outlet port and back to said fluid chamber; valve means constructed and arranged to control the fluid discharge through said outlet port, said valve means being biased to open position and including valve stem means for operating said valve means; and centrifugal means, comprising weighted cam means mounted for movement radially of the axis of rotation, said cam means being biased in a direction toward the axis of rotation, but being movable radially outwardly as the rotation of the driving shaft reaches a predetermined speed, said cam means, when moved radially outwardly, being engageable with said valve stem means and constructed and arranged to cam said valve stem valve means toward position closing said valve means and thereby restricting fluid discharge through said outlet port, such restricting of fluid discharge providing opposition to the relative movement between said casing means and said rotor means and causing transmission of movement from the driving shaft to the driven shaft.

ARTHUR L. HOOVER.